United States Patent [19]

Matsuda et al.

[11] Patent Number: 4,890,545
[45] Date of Patent: Jan. 2, 1990

[54] AIR CONDITIONER

[75] Inventors: Kenji Matsuda; Tetsuji Okada; Hiroyuki Umemura; Hidenori Ishioka; Katsuyuki Aoki, all of Shizuoka, Japan

[73] Assignee: Mitsubishi Denki Kabushiki Kaisha, Tokyo, Japan

[21] Appl. No.: 219,408

[22] Filed: Jul. 15, 1988

[30] Foreign Application Priority Data

Oct. 1, 1987 [JP] Japan .................. 62-248421
Oct. 6, 1987 [JP] Japan .................. 62-251998

[51] Int. Cl.[4] ........................................... F24F 11/02
[52] U.S. Cl. .................................. 98/39.1; 98/40.24
[58] Field of Search ............... 98/39.1, 40.24, 40.25, 98/40.26, 40.27

[56] References Cited
FOREIGN PATENT DOCUMENTS

| | | | |
|---|---|---|---|
| 55-3503 | 1/1980 | Japan | 98/39.1 |
| 57-153128 | 9/1982 | Japan | 98/40.24 |
| 59-86843 | 5/1984 | Japan | 98/40.24 |
| 59-109741 | 6/1984 | Japan | 98/40.24 |

Primary Examiner—Harold Joyce
Attorney, Agent, or Firm—Sughrue, Mion, Zinn, Macpeak, and Seas

[57] ABSTRACT

An air conditioner capable of performing air conditioning in a room regardless of installation condition of an indoor unit thereof and the air blow condition, that is, a blow power of a heated or cooled air blow. The air conditioner comprises: means for setting an installation condition of an indoor unit of said air conditioner; means for setting a condition of an air blow produced from said indoor unit; and means for controlling a standard condition in the air blow condition set provisionally by said air blow condition setting means after taking the installation condition set by said installation condition setting means into account to obtain uniform room temperature distribution.

6 Claims, 8 Drawing Sheets

AIR CONDITIONER

BACKGROUND OF THE INVENTION (1) Field of the Invention

The present invention relates to an air conditioner capable of distributing the temperature in a room uniformly regardless of the installation position of an indoor unit of the air conditioner.

(2) Description of Prior Art

Figure 10:
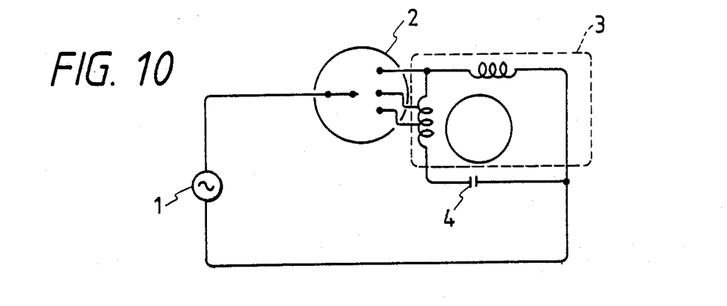
FIG. 10 is a circuit diagram showing an example of a control circuit for use in a conventional air conditioner.

FIG. 10 is a diagram showing an electric circuit for setting the rotation speed of an indoor fan in the indoor unit of a conventional air conditioner, which was disclosed in Published Unexamined Japanese patent application No. 28152/1977. In FIG. 10, reference numeral 1 designates an AC power source; 2, a blowing power switch for changing the rotation speed of a motor 3 for driving the indoor fan to one of "HIGH", "LOW" and "GENTLE" for instance; and 4, a start capacitor.

Figure 11:
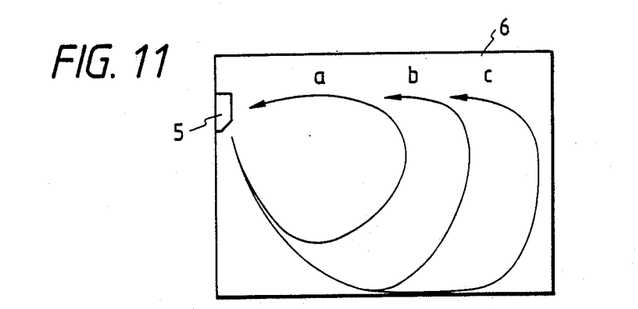
FIGS. 11, 12 and 13 are diagrams showing examples of air blow conditions in a room with a conventional air conditioner, respectively.

With such an electric circuit as shown in FIG. 10, the rotational speed of the indoor fan is varied according by switching the blowing power switch 2. Assuming that the direction of air blow produced by the indoor fan is directed downwardly during a heating operation for instance, the air blow stream from the indoor unit 5 in is room 6 is as shown in FIG. 11. As the rotation speed of the fan increases, the heated air flow stream varies as indicated by "a", "b" and "c" in FIG. 11, respectively. More specifically, in the case where the blowing power switch 2 selects the "HIGH" air blow power operation, the temperature of the heated air blow blown downwardly becomes relatively low and the flow path thereof is relatively long. As a result, as indicated by the "c" in FIG. 11, air in the room can be agitated well resulting in uniform room temperature distribution. In this case, however, the "HIGH" air blow may be uncomfortable to people in the room and further the indoor fan is noisy when rotating at a high speed. Consequently, while the above described good agitation effect can be obtained by the "HIGH" air blow power operation, in view of the shortcomings, there is a tendency to use the air conditioner under the "LOW" or "GENTLE" air blow power operation.

Figure 12:
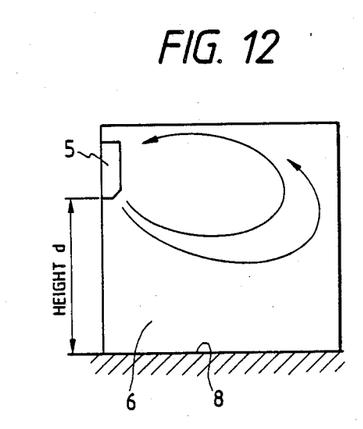

In the "LOW" or "GENTLE" air blow power operation, the flow path of the heated air blown downwardly is shortened as indicated by the "a" or "b" in FIG. 11. Further, as shown in FIG. 12, in case where the installation position (height) d from a floor 8 of the room is relatively high, it is disadvantageous in that the heated air blow may be directed upwardly before reaching the floor 8. This results in degrading the room temperature distribution.

Figure 13:
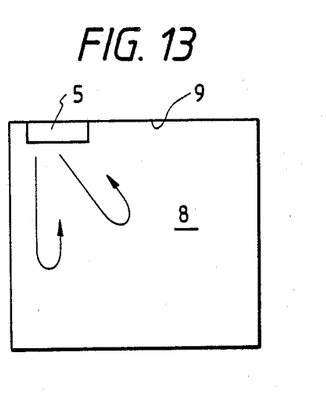

Moreover, in the case where the installation position of the indoor unit 5 to a wall 9 of the room is one one-sided, as shown in FIG. 13, it is unlikely that the heated air blow will expand horizontally near to the floor 8. In addition, it is also disadvantageous in that it may be difficult for the heated air blow to reach the center of the room or another side of the room opposite to the installation position. This results in degrading performance of the air conditioner such as making the room temperature distribution non uniform.

The conventional air conditioner thus constructed has drawbacks that uniform room temperature distribution may not be always obtained depending on the installation conditions, particularly the installation height from a floor and the installation position in a horizontal direction with respect to a center of a wall, in case of selecting the lower rotation speed of the fan, (i.e., the "LOW" or "GENTLE" air flow power operation) that is used frequently during not only the heating operation but also the cooling or circulating operation. In other words, with the thus constructed prior art air conditioner, there may be a problem that the heated or cooled air blow may not arrive at the floor thereby resulting in degrading the room temperature distribution during the relatively lower rotation speed operation of the fan.

SUMMARY OF THE INVENTION

In view of the above, an object of the present invention is to eliminate the drawbacks accompanying the conventional air conditioners.

Another object of the present invention is to provide an air conditioner capable of performing air conditioning in a room regardless of installation conditions of an indoor unit thereof and air blow conditions, i.e., the rotation speed of a fan for blowing heated or cooled air blow, which is equivalent to an air blow power and the air blow direction.

The above, and other objects of the present invention is met to the provision of air conditioner which comprises: means for setting an installation condition of an indoor unit of said air conditioner; means for setting a condition of an air blow produced from said indoor unit; and means for controlling the air blow condition set provisionally by said air blow condition setting means in accordance with both the installation condition and the air blow condition.

DESCRIPTION OF THE PREFERRED EMBODIMENTS

A first embodiment of the present invention will be described with reference to the drawings, and particularly the heating operation thereof will be described.

Figure 1:
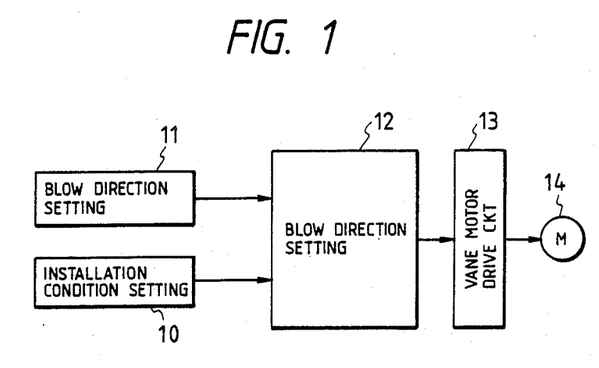
FIG. 1 is a block diagram showing a first embodiment of a control system for use in an air conditioner according to the present invention.

In FIG. 1, which is a block diagram showing the first embodiment of a control system for use in an air conditioner according to the present invention, reference numeral 10 designates an installation condition setting means for setting installation conditions of an indoor unit of the air conditioner with respect to a room; 11, an air flow condition setting means for setting a flow direction of a heated air blow during the heating operation; 12, a flow angle determination means for determining the flow angle. The flow angle determination means 12 receives outputs of the above described means 10 and 11 to determine the flow angle thereof according to a certain control program described in detail later. The output of the determination means 12 which represents the flow angle of the heated air blow, is supplied to the following vane motor drive circuit 13 so as to drive a vane motor 14 for controlling and setting the air flow angle.

Figure 2:
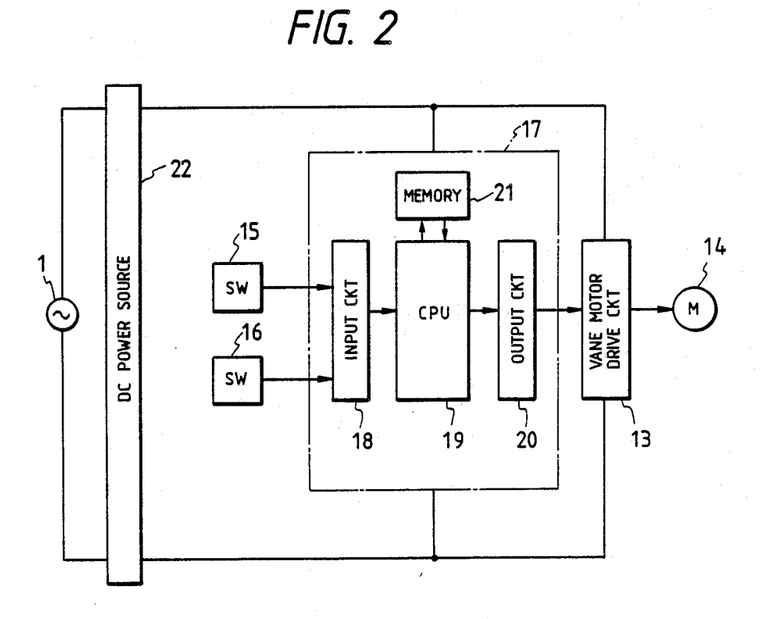
FIG. 2 is a block diagram showing a first embodiment of a control circuit in the first embodiment of FIG. 1.
Figure 3:
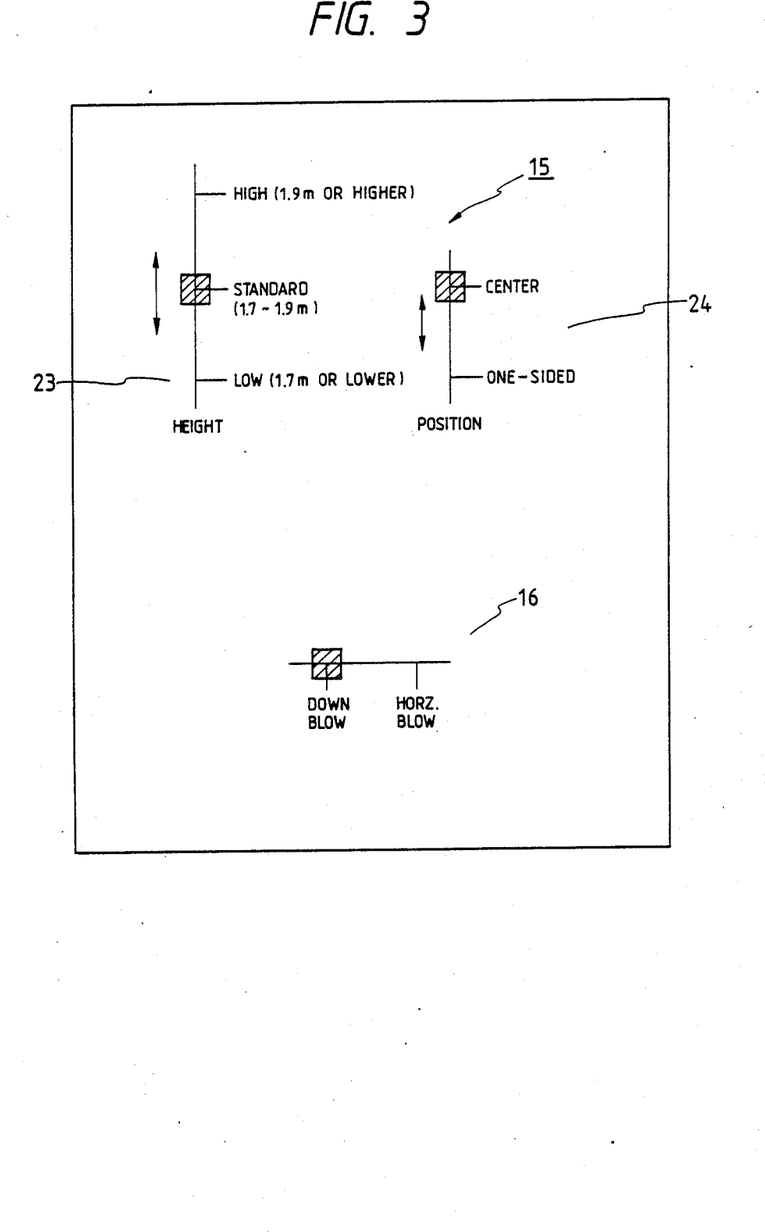
FIG. 3 is a diagram showing a switch unit shown in FIG. 2 in detail.

FIG. 2 is a circuit diagram showing a first embodiment of a control circuit according to the present invention. In FIG. 2, reference numeral 1 denotes an AC power source; 15, an installation condition setting switch acting as the installation condition setting means 10 in FIGS. 1 and 16, an air flow direction changing switch acting as the air flow condition setting means 11 in FIG. 1. Details for both switches 15 and 16 are shown in FIG. 3. The installation condition setting switch 15 is constituted by a switch 23 for setting the installation position of an indoor unit of the air conditioner in a vertical direction of the room (installation height) and a switch 24 for setting the installation position thereof in horizontal direction of the wall of the room. In this example, assuming that a standard height of the installation position from the floor is determined to a range from 1.7 m to 1.9 m, the switch 23 is adapted to set whether the installation position is higher than the standard height or not. On the other hand, the switch 24 is adapted to set such an installation condition in the horizontal direction that the indoor unit is installed at the center of the wall or is one-sided with respect to the center thereof. The air flow direction changing switch 16 is capable of setting the direction of an air flow to one of two directions such as "DOWNWARD AIR FLOW" and "HORIZONTAL AIR FLOW".

The outputs of the respective switches 16, 23 and 24 are applied to an input circuit 18 of a microcomputer 17 shown in FIG. 2. The microcomputer 17 comprises the input circuit 18, a CPU 19, an output circuit 20 and a memory 21 to have an air flow angle determination function for the heated air flow. An air flow angle determination instruction which is determined by the function, is supplied through the output circuit 20 to the vane motor drive circuit 13 so that the air flow angle is varied by the movement of a vane driven by a vane motor 14. Reference numeral 22 denotes a DC power source.

An operation of the first embodiment will be described hereinafter.

After the indoor unit 5 is installed at a certain position in the room, both the installation height d from the floor 8 and the position in the horizontal direction are first checked, and then the respective switches 23 and 24 of the installation condition setting switch 15 are set according to the result of the checking. In addition, the user selects the direction of an air flow and operates the air flow direction switch 16 to set the desired flow direction. Upon receiption of the input signals from these switches, the flow angle determination means 12 including a microprocessor determines the flowing angle of an air flow so as to control the movement of the vane driven by the vane motor 14.

On the other hand, the memory 21 stores a control program including a certain program for determining the flowing angle in advance. The operation sequence is shown in a flow chart of FIG. 4. The operation will be now described with reference to FIG. 4.

Figure 4:
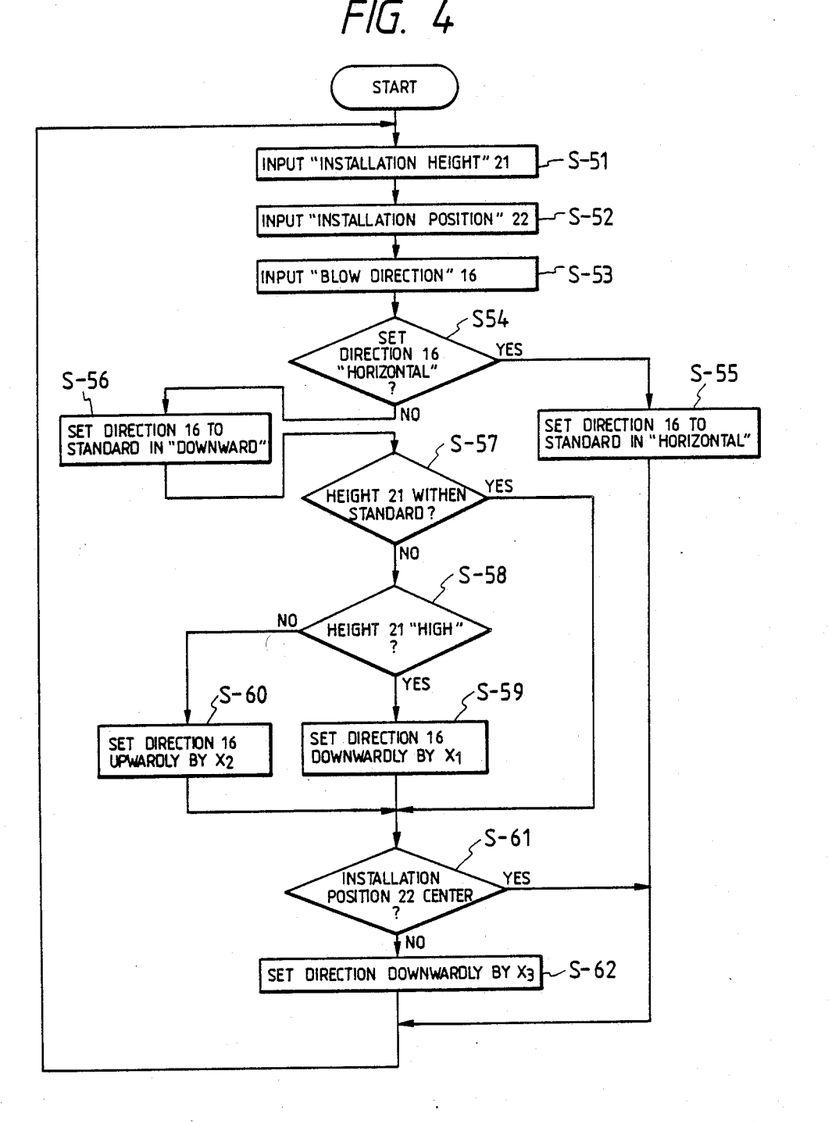
FIG. 4 is a flow chart showing an operation of a blowing angle determination means.

In steps 51 to 53, as described above, the output signals of the respective switches 21, 22 and 16 are input through the input circuit 18 to the CPU 19, respectively. Then, in a step 54, it is confirmed whether the flow direction is in a horizontal direction or not. If the direction is the horizontal one, that is "YES" in the step 54, the flow direction changing switch 16 is set to "HORIZONTAL" in a step 55, so that the vane is positioned at a standard position in the "HORIZONTAL AIR FLOW" operation to produce the most preferable air blow for air-conditioning under a standard installation condition such that the installation height d is within the standard range and the indoor unit is not one-sided. If "NO" in the step 54, the switch 16 is set to "DOWNWARD" in a step 56, so that the vane is positioned at a standard position in the "DOWNWARD AIR FLOW" operation to produce the most preferable air flow under the above described installation standard condition.

In the following step 57, it is confirmed whether the installation height d is within the standard range. If "YES", the operation step is allowed to advance to a step 61 and thus no correction of the flow direction with respect to the installation height is carried out. If "NO", that is if the installation height d is not within the standard range, it is detected whether the installation height d is higher than the standard range or not in a step 58. If "YES", that is if the height exceeds the standard range, the flow direction is corrected downwardly by $+X_1$ in a step 59. On the other hand, if "NO", that is if the height is lower than the standard range, the flow direction is corrected upwardly by $+X_2$ in a step 60.

In a step 61, based on the setting of the horizontal installation position setting switch 16, it is confirmed whether the indoor unit is installed at the center of the wall of the room or not. If "YES", that is if the position is center, no correction for the standard flow direction is required. If "NO", the standard blow direction is corrected downwardly by $+X_3$ in a step 62. The signal representing the thus determined flow angle is supplied to the vane motor drive circuit 13 shown in FIG. 2, where a power supply to the vane motor 14 is accomplished so as to set the vane at the determined blow angle. In summary, in the case where the switches 23 and 24 are set to indicate the fact that the installation height exceeds the standard range or the installation position is one-sided and further the switch 16 is set to "DOWNWARD", the flow angle set by the vane motor 14 is corrected slightly downwardly. Due to this control operation, even if the installation condition is changed under the condition that the flow angle has been set downwardly, suitable arrival distance of air flow can be obtained.

In the above first embodiment, although the installation height and the installation position of the indoor unit are sampled as installation condition, modifications are possible in order to improve the efficiency in air-conditioning without departing from the essential scope of the present invention. For example, a size of the room and a shape of the room may be input as the installation condition.

The second embodiment of the present invention in which a flow rate is taken into account instead of the flow direction as in the first embodiment, will be described with reference to FIGS. 5 to 9. In FIGS. 5 to 9, components same as those in FIGS. 1 to 4 bear the same or corresponding reference numerals.

Figure 5:
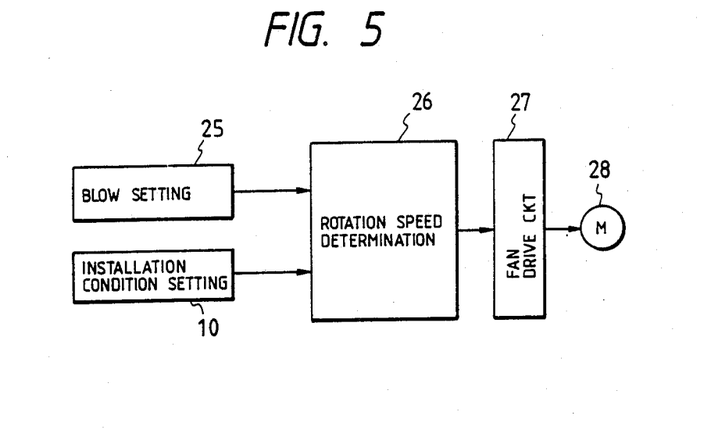
FIG. 5 is a block diagram showing a second embodiment of a control system for use in the air conditioner.

FIG. 5 is a block diagram schematically showing a second embodiment of a control system for an air conditioner according to the present invention. In FIG. 5, reference numeral 25 designates an air flow rate setting means for provisionally setting a flow rate of air flow from an indoor unit such as heated air flow during a heating operation for instance; and 26, a rotation speed determination means for setting the rotation speed of the indoor fan to a rotation speed corresponding to the air flow rate. The rotation speed determination means 26 receives the outputs from the above described means 10 and 25 to be subjected to an arithmetic operation therein to thereby determine the rotation speed of the indoor fan. An output from the determination means 26 is applied to the following fan drive circuit 27 so as to control a drive motor constituting a drive unit.

Figure 6:
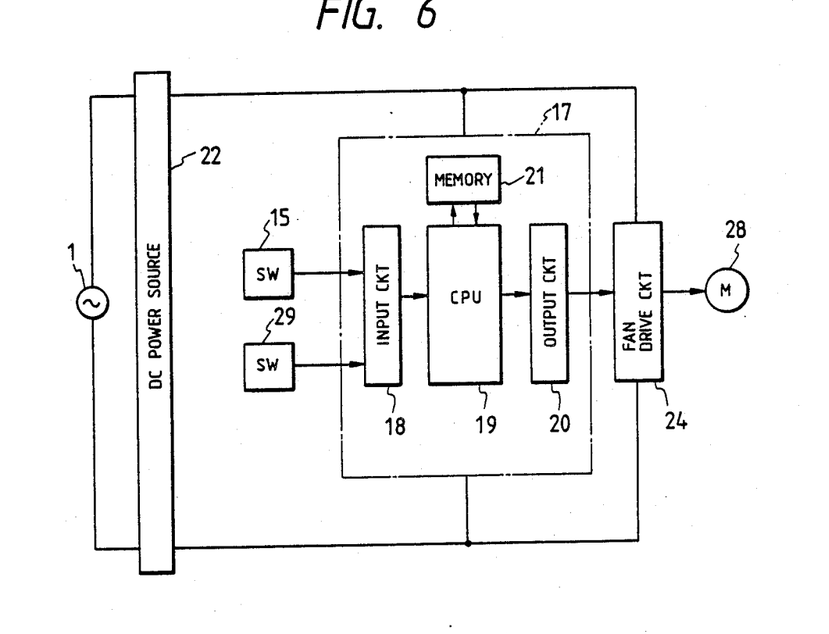
FIG. 6 is a block diagram showing a second embodiment of the control system in the second embodiment.
Figure 7:
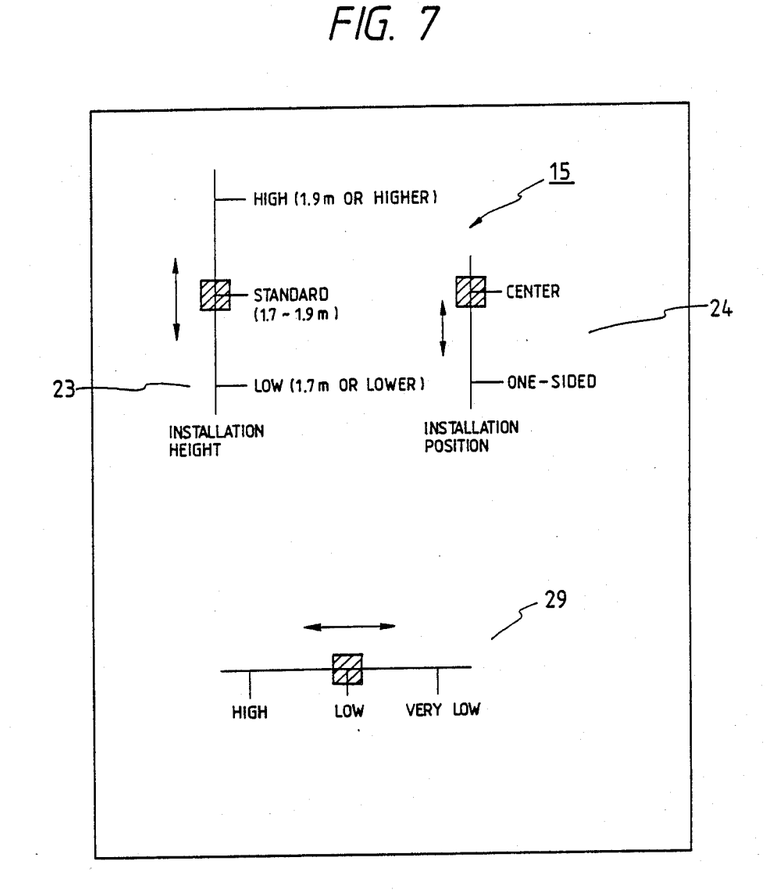
FIGS. 7 and 8 are diagrams showing the switch shown in FIG. 6 in detail.

FIG. 6 is a block diagram showing the second embodiment of the control system in detail. In FIG. 6, reference numeral 15 designates a switch for setting an installation condition, which acts as the installation condition setting means 10, and reference numeral 29 designates a switch for changing an air flow rate, which acts as the air flow rate setting means 25. Both switches 15 and 29 are shown in detail in FIG. 7. The installation condition setting switch 15 is constituted by a switch 23 for setting the installation position of the indoor unit of the air conditioner in a vertical direction of the room (installation height) and a switch 24 for setting the installation position thereof in horizontal direction of a wall of the room. The switch 23 is adapted to set whether the installation position is higher than a predetermined standard height or not. On the other hand, the switch 24 is adapted to set such an installation condition in the horizontal direction that the indoor unit is installed at the center of the wall or is one-sided with respect to the center thereof. The air flow rate changing switch 29 is capable of setting the air flow rate to three steps such as "HIGH", "LOW" and "GENTLE".

The output signals from the above described switches 23, 24 and 29 are supplied to the input circuit 18 of the microcomputer 17 shown in FIG. 6. The microcomputer 17 comprises the input circuit 18, the CPU 19, the output circuit 20 and the memory 21 to have a rotation speed determination function for the indoor fan. An output signal from the output circuit 20, which represents a rotation speed instruction determined by the rotation speed determination function, is applied to the fan drive circuit 27 to control the rotation speed of the indoor fan 28.

An operation of the second embodiment of the present invention will be described.

After installation of the indoor unit, the installation height is measured and it is confirmed whether the indoor unit is one-sided or not. The results of the measurement and confirmation are set by the setting switches 23 and 24. Further, a user operates the switch 29 to select a desired air flow rate. Upon receipiton of these input signals, the rotation speed determination means 26 including the microcomputer operates to determine the rotation speed of the indoor fan.

Figure 9:
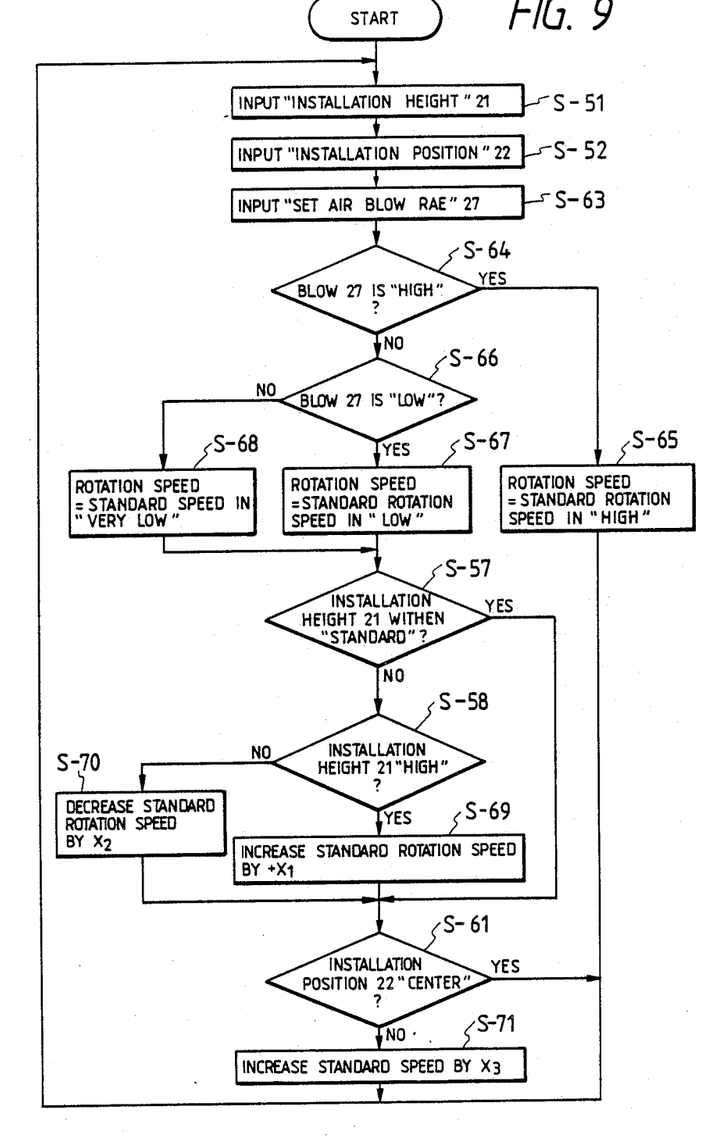
FIG. 9 is a flow chart for the description of a rotation speed determination means.

On the other hand, an operation program for determining the rotation speed is stored in advance in the memory 21. FIG. 9 is a flow chart for a description as to the operation program. The operation will be described with reference to the flow chart.

In steps 51, 52 and 63, the outputs from the installation condition setting switch 15 and the flow speed selecting switch 29 are received. It is confirmed in a step 64 whether the switch 29 is set to "HIGH" or not. If the switch 29 is set to "HIGH", the rotation speed of the motor is set to a standard speed in the "HIGH" air flow rate operation in a step 65. If "NO" in the step 64, it is confirmed whether the switch 29 is set the "LOW" or not in a step 66. If "YES", that is the switch 29 is set to "LOW" in the step 66, the rotation speed of the motor is set to a standard speed in the "LOW" air flow rate operation in a step 67. On the other hand, if "NO", that is the switch 29 is set to "GENTLE" in the step 66, the rotation speed of the motor is set to a standard speed in the "GENTLE" air flow rate operation. The standard speed represents a suitable rotation speed for making the heated air flow reach the floor under such a standard condition that the installation height is within a standard range from 1.7 to 1.9 m, for instance, and the indoor unit is positioned in the center of the room. In step 57, it is confirmed whether the installation height is within the standard range based on the input signal from the switch 23. If the installation height is within the standard range, the step is allowed to advance to step 61 and no correction for the standard rotation speed based on the installation height is achieved. If the installation height is not within the standard range, it is detected whether the position is higher than the standard range or not in step 58. In case of being higher, the rotation speed is increased by $X_1$ in a step 69. On the other hand, in case of being lower, the rotation speed is decreased by $X_2$ in a step 70.

Further, it is detected whether the installation position of the indoor unit is one-sided or centered in a step 61 based on the input signal from the switch 24. In case of the position being center, no correction for the standard rotation speed is carried out. On the other hand, in case of the position being one-sided, the rotation speed is increased by $X_3$ in a step 71. The instruction signal representing thus determined rotation speed is applied to the fan drive circuit 27 so as to drive the motor 28 at the speed thus determined. More specifically, when the flow rate is set to either "LOW" or "GENTLE" air flow rate operation and, either the installation position is higher than a standard range or the installation position is one-sided, the standard rotation speed in the respective "LOW" and "GENTLE" air flow rate operations is corrected to be made slightly higher. As a result, even if the installation condition is changed with the selecting of the air flow rate to either "LOW" or "GENTLE", the flow speed can be controlled so that the air flow can reach the floor to thereby perform preferable air-conditioning.

Figure 8:
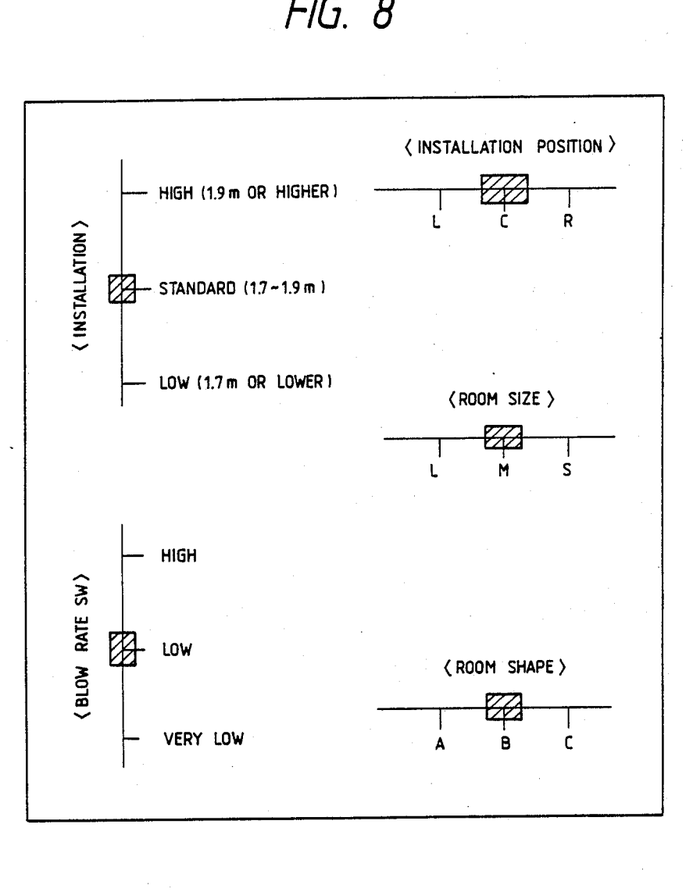

Although the setting of the installation condition is carried out by setting the installation height and the installation position in the above described second embodiment of the present invention, as is similar to the first embodiment thereof, modifications are possible. For example, the size and shape of the room may be added to the installation condition as shown in FIG. 8 resulting in improving the air-conditioning effect.

Further, the control system including the microcomputer, memory and the like in the first and second embodiment of the present invention may be replaced by ordinary electric circuits and logic circuits.

As is apparent from the above description, according to the first embodiment of the invention, since the air flow direction is adjustable according to the installation condition of an indoor unit, such difficulty accompanying the conventional air conditioner such as the inability of the standard air flow to reach the floor resulting in non-uniform room temperature distribution, can be positively eliminated to thereby always obtain comfortable air-conditioning regardless of the installation direction.

Moreover, according to the second embodiment of the invention, since the rotation speed of a fan can be varied according to the installation condition of the indoor unit, the same effects as those in the first embodiment can be obtained.

While the heating operation of the air conditioner according to the present invention has been described in detail, it goes without saying that the present invention is available for the cooling operation and the circulating operation.

We claim:

1. An air conditioner having an indoor unit positioned in a room, comprising:
   means for setting an installation position of said indoor unit with respect to said room;
   means for setting the direction of air flow produced from said indoor unit; and
   means for adjusting the direction of air flow provisionally set by said air flow condition setting means based on the actual installation position to obtain uniform room temperature distribution.

2. The air conditioner as defined in claim (1) wherein said installation position setting means inputs data representing an installation height of the indoor unit from the floor of said room and an installation position of the indoor unit with respect to the center of the wall of said room.

3. The air conditioner as defined in claim (2) wherein said installation position setting means further inputs data representing the size and the shape of said room.

4. An air conditioner having an indoor unit positioned in a room, comprising:
   means for setting an installation position of said indoor unit with respect to said room;
   means for setting an air flow rate produced from said indoor unit; and
   means for adjusting said flow rate provisionally set by said air flow rate setting means based on the actual installation position to obtain uniform room temperature distribution.

5. The air conditioner as defined in claim (4) wherein said installation position setting means inputs data representing an installation height of the indoor unit from the floor of said room and an installation position of the indoor unit with respect to the center of the wall of said room.

6. The air conditioner as defined in claim (5) wherein said installation position setting means further inputs data representing a size and a shape of said room.

* * * * *